Oct. 27, 1959  J. R. CAMPBELL  2,910,153
STRUCTURAL PANEL OF HONEYCOMB TYPE
Filed Sept. 6, 1955
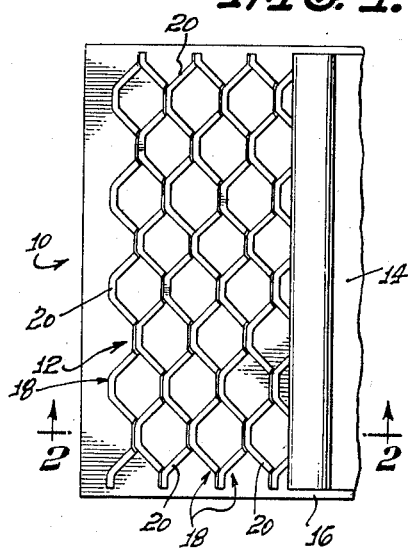
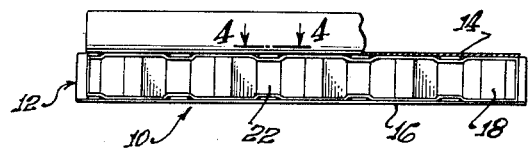
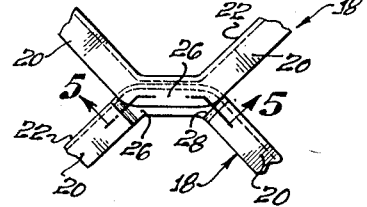
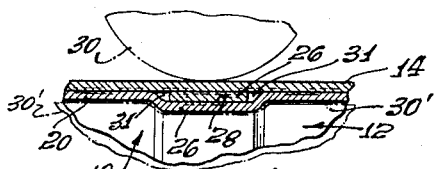
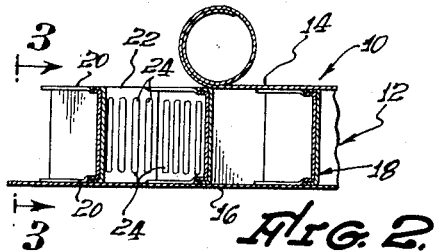
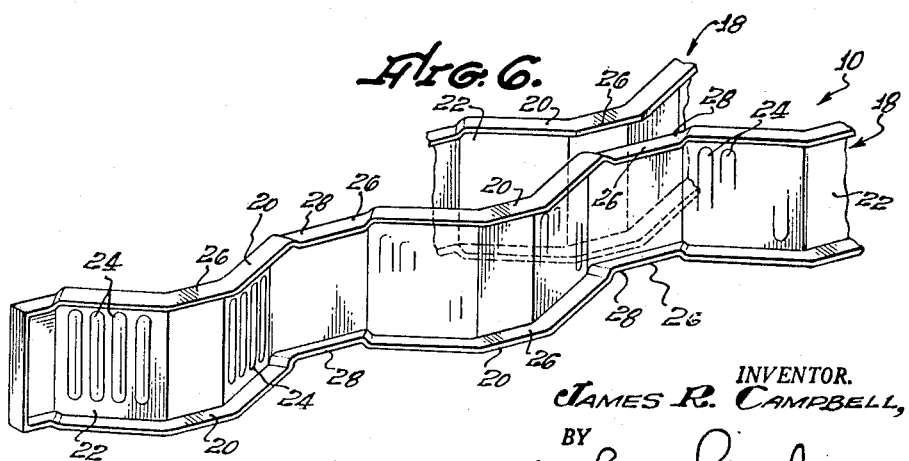
INVENTOR.
JAMES R. CAMPBELL,
BY
Thomas P. Mahoney
ATTORNEY

United States Patent Office 2,910,153
Patented Oct. 27, 1959

2,910,153

STRUCTURAL PANEL OF HONEYCOMB TYPE

James R. Campbell, Laguna Beach, Calif.

Application September 6, 1955, Serial No. 532,605

8 Claims. (Cl. 189—34)

This invention relates to a structural panel which incorporates a honeycomb-type core to the opposite sides of which are secured upper and lower surface sheets.

Honeycomb panels are conventionally fabricated by the use of a plurality of corrugated strips of aluminum foil, or the like, which are bonded to one another by the use of various types of cements to form a honeycomb core and there are subsequently secured to the opposite surfaces of the core, by the utilization of the same cements, upper and lower surfacing sheets which may be formed from aluminum, or the like. Obviously, the critical factor involved in the fabrication of the cores and the fabrication of the panels incorporating the cores is the fact that the entire assembly is dependent for its structural integrity upon the efficacy of the cements used to bond the various components of the structural panel together. Therefore, in high temperature applications and in applications wherein the stresses imposed upon the structural panel are of a high order, break-down of the panel inevitably occurs because of the fact that the cements utilized deteriorate and the component parts of the structural panel become separated from one another.

In order to overcome these obvious defects of conventional structural panels of the honeycomb types, attempts have been made to fabricate the honeycomb cores by spot welding the individual strips of corrugated foil to one another and subsequently attempting to weld or braze the surfacing sheets to the upper and lower surfaces of the core. Such attempts have not been successful because of the fact that the spot welding operations on the cores themselves are extremely complex, and because of the fact that successful weldments have not been achieved between the upper and lower surfacing sheets and the core itself.

It is, therefore, an object of my invention to provide a structural panel wherein all of the elements of the core and the upper and lower surface sheets are adhered thereto by welding and wherein the resulting structural panel is charactertized by its resistance to high temperatures and high mechanical loads.

Another object of my invention is the provision of a structural panel of the aforementioned character wherein the core thereof is fabricated from a plurality of strips of stainless steel, or the like, said strips being corrugated and having provided upon the opposite edges thereof continuous flanges which extend in planes normal to the planes of the strips. During the assembling of the strips to create a core structure, the nodal points of the corrugations and, more particularly, the flanges at said nodal points are interfitted one within the other to mechanically associate the individual corrugated strips into a unitary core and to properly transmit shear loads.

A further object of my invention is the provision of a structural panel of the aforementioned type wherein the surface sheets may be fabricated from stainless steel or the like and wherein the laterally extending flanges on the opposite edges of the core structure engage the interior surfaces of the sheets and are welded thereto by the use of a seam welder. It is a commonly accepted fact that seam welding, by passage of current through two or more strips sandwiched together between suitable electrodes, is far simpler, faster, and more dependable than butt welding or brazing, particularly when the strips are of thin materials.

It is of particular importance to note that, while the individual corrugated strips constituting the honeycomb core of the structural panel are mechanically interrelated with each other by the reception of the flanges of the nodal points of the corrugations, one within the other, ultimate integration of the strips in the core structure and of the core structure with the upper and lower surface sheets is accomplished simultaneously by the seam welding process. This is attributable to the fact that, as the welding process takes place, the surface sheets are welded to the flanges on the individual strips underlying the same and are also welded to the flanges at the nodal points of the strips simultaneously causing the nodal points of the strips to be welded to each other.

Because of the relatively wide area afforded by the laterally directed, continuous flanges on the opposite edges of the individual strips constituting the core structure of the structural panel and because of the weldments which occur at the nodal points of the flanges and the surface sheets themselves, a rigid, strong, and thermally resistant structural panel is achieved which can be subjected to high mechanical loads and high temperatures without the failure of the weldments and the consequent breaking of the structural bond between the various components of the panel.

As the flexural stresses in the panel delineate themselves into bands extending substantially at 45° to the moment arm producing the stress and, as these flexural stresses are concentrated in the surfacing sheets, the flanges on the core strips serve to reinforce the surfacing sheets against buckling as well as provide proper attachment means through their greater area of contact with the surface sheets. Therefore, the added weight in the flanges of the core allows a reduction in surface sheet weight.

It is a further object of this invention to provide a structural panel which may be homogeneous, not requiring any materials such as resins, brazing alloys, fluxes, conductors and the like and, as such, may be treated essentially on the basis of the physical properties of the component material.

It is a further object of this invention to provide a structural panel which may breathe by virtue of fluid communication between the cells of the core incorporated in said panel and not be destroyed by excessive pressure due to temperature change.

Other objects and advantages of my invention will be apparent from the following specification and the accompanying drawing which is for the purpose of illustration only and in which:

Fig. 1 is a top plan view showing the relationship between the core and the surface sheets or skins of a structural panel constructed in accordance with the teachings of my invention;

Fig. 2 is a vertical, sectional view taken on the broken line 2—2 of Fig. 1;

Fig. 3 is an end view taken from the broken line 3—3 of Fig. 2;

Fig. 4 is an enlarged, fragmentary view showing the manner to which the nodal points on the individual corrugated strips constituting the core interfit, one within the other;

Fig. 5 is an enlarged, fragmentary view taken from the broken line 5—5 of Fig. 4; and Fig. 6 is an enlarged perspective view showing portions of two strips of the character utilized to fabricate the core of the panel of my invention.

Referring to the drawing and particularly to Figs. 1-3 thereof, I show a structural panel 10 of the honeycomb type incorporating a reinforcing core 12 to the opposite surfaces of which are affixed, in a manner to be described in greater detail below, upper and lower surface sheets 14 and 16, respectively.

Although it is obvious that the structural panel 10 can be fabricated from any desired type of sheet metal, or the equivalent thereof, I propose in the present instance to fabricate both the core 12 and the upper and lower surface sheets from stainless steel sheet stock to obtain the desired structural and thermal characteristics of stainless steel in the resulting panel.

The core 12 is, as previously indicated, of the honeycomb type and is constituted by a plurality of corrugated strips 18. The strips 18 are, in the present embodiment of my invention, die formed so that accurate dimensioning thereof may be obtained to establish the optimum structural relationship between the individual strips when they are internested, one within the other, in a manner to be described in greater detail hereinbelow.

Each of the strips 18 is provided on its upper and lower edges with a projection or flange 20, the flanges 20 being disposed in planes which are substantially normal to the plane of the strip 18 and extending laterally therefrom.

The webs 22 of the strips 18 are provided with ribs 24 which materially augment the strength of the strips and the ridges of the corrugated strips 18 constitute nodal points 26 which are adapted to fit, one within the other, so that the strips 18 may be mechanically connected prior to the affixation to the core 12 constituted by said strips of the upper and lower surface sheets 14 and 16.

In order to facilitate the mechanical securement of the strips 18 in operative relationship with one another, the oppositely disposed flanges of the strips are crimped or deformed at alternate ridges of the corrugations and at the nodal points to provide recesses or depressions 28.

Therefore, when the strips 18 are assembled into mechanical relationship with each other, a nodal point having depressions 28 thereat will be interfitted with a nodal point having a continuous undeformed flange so that the depressions 28 can interfit with the flange without the spreading of the undeformed flange by the entry of the adjacent flanges of the nodal point therebetween.

Thus, the nodal points having the depressions 28 therein may be considered to be male nodal points and the nodal points wherein the flanges 20 are undeformed may be considered as female nodal points. Thus, prior to the affixation of the upper and lower skins or surface sheets 14 and 16, respectively, upon the upper and lower surfaces of the core 12, the individual strips 18 constituting the core are mechanically assembled by the interfitting of the male and female nodes on the strips 18 with each other. It will also be noted that, as best shown in Figs. 4 and 5 of the drawing, the entry of the deformed flanges at the male nodal points into the space between the undeformed flanges constituting the female nodal points serves to restrict the individual strips 18 against relative movement with respect to one another since the sides of the recesses or depressions 28 on the male nodal points impinge on the edges of the adjacent flanges and serve to maintain said flanges in operative relationship, one with the other.

Although the assembly of an entire honeycomb core 12 prior to the affixation to the opposite surfaces thereof has been described, it is conceivable that such a core can be gradually built up as the affixation of the skins or sheets 14 and 16 to the opposite surfaces of the core is accomplished. Whatever method may be utilized in assembling the constituent strips 18 into the honeycomb core 12, the resulting core 12 is characterized by the fact that the constituent strips 18 thereof are mechanically interlocked prior to the affixation of the opposite surfaces thereof of the skins or sheets 14 and 16. In the assembly of a core, prior to surface sheet attachment, it will be obvious that mating webs at nodal points may be welded to each other if desired.

As best shown in Fig. 5 of the drawing, apertures 31 remain at the interfitting nodal points of the strips 18 which permit fluid communication between the contiguous cells and throughout the entire core and panel structure.

In one method of assembling the core 12 in operative relationship with the skins or sheets 14, the individual strips 18 are supported upon a mating electrode 30' having a corrugated shape conforming to the shape of a strip mounted thereupon. The mating electrode is moved in the space between the upper and lower skins or sheets 14 and 16 and the strip thereupon is mechanically interlocked with a strip already deposited between the upper and lower skins or sheets 14 and 16. Subsequently, as best shown in Fig. 5 of the drawing, a rotary seam welder, indicated at 30, is translated across the surface of the outer sheet 14 or 16, whichever may be the case, and a weldment created between the continuous flanges 20 and the underside of the sheet and between the interlocking nodal points 26 of the adjacent strips.

In this manner, a continuous weldment along the entire length of the flanges of each of the strips and an additional weldment at the nodal points of the interlocked strips is achieved, thus providing a structural panel characterized by its ability to stand high mechanical loads without buckling or failing in any way whatsoever. While the cells of the core are shown as being of hexagonal configuration, they could, of course, be square or another desired shape.

While I have described the structural panel of my invention as fabricated from stainless steels and the like, it is, of course, not intended that the materials utilized be limited to the specific material, but that any resistance weldable metal be used if necessary, such as the ferrous metals and alloys, nickel group alloys, titanium, aluminum, magnesium, or any other metals suitable for or treated in such a manner as to be suitable for resistance welding.

Furthermore, while I have disclosed the structural panel and the elements thereof as being maintained in operative relationship by means of welding, it is conceivable that in low temperature and low stress applications that the strips constituting the core be secured to each other by the use of conventional resin-base cements and that the upper and lower sheets or skins be secured to the opposite surfaces of the core by the use of resin cements, brazing, or the like.

Also, the teachings of this invention are fully applicable to nonmetallic panel components, as exemplified by paper, fiber glass, resins, etc. The fabrication means utilized then being a bonding means such as a resin cement, or the like.

I thus provide by my invention a core for use in structural panels which is characterized by its having thereupon relatively large continuous surfaces adapted to be secured in operative relationship with adjacent surfaces of upper and lower skins or surface sheets and a structural panel which is characterized by its minimum weight, maximum strength, and maximum resistance to the effects of temperature.

I claim as my invention:

1. A core for a structural element including a plurality of corrugated strips having flanges on the upper and lower edges thereof directed in planes substantially normal to the planes of said strips, the flanges of said strips fitting within each other at nodal points to structurally integrate said strips into said core, said flanges having recesses at alternate nodal points to provide male nodal points receivable in adjacent nodal points.

2. A core for a structural element including a plurality of strips having projections on their opposite edges directed in planes substantially normal to the planes of said strips, the projections of adjacent strips fitting one within the other at nodal points to structurally integrate said strips into said core, said projections having recesses at alternate nodal points to provide male nodal points receivable in adjacent nodal points.

3. In a structural panel, the combination of: a honeycomb-type core constituted by a plurality of corrugated strips having right-angularly oriented flanges interfitted with one another at the nodes of their corrugations, said flanges being depressed at alternate nodes to facilitate the interfitting of said flanges; and upper and lower surface sheets welded to said flanges on the opposite sides of said core.

4. In a structural panel, the combination of: a honeycomb-type core constituted by a plurality of corrugated strips having right-angularly oriented flanges on their upper and lower edges interfitting within the flanges of adjacent strips at the nodes of said corrugations, the flanges at said nodes being welded to one another; and upper and lower surface sheets welded to said flanges on opposite sides of said core.

5. In a structural panel, the combination of: a honeycomb type core constituted by a plurality of corrugated strips having right-angularly oriented flanges interfitted with one another at the nodes of their corrugations to define apertures establishing fluid communication between the cells of said core; and surface sheets welded to said flanges on the opposite sides of said core.

6. In a structural panel, the combination of: a honeycomb core constituted by a plurality of corrugated channels each having a web and right-angularly oriented flanges on the opposite edges thereof, said flanges being provided with depressions at alternate nodal points of said corrugated channels and said depressions being fitted within undepressed nodal points of an adjacent channel; and a surface sheet secured to the flanges of said channels on one side of said channels.

7. In a structural panel, the combination of: a honeycomb core having a plurality of corrugated channels whose opposite flanges are interfitted within one another at adjacent nodal points to provide two superimposed layers of material at interfitting nodal points; and surface sheets secured to said flanges to provide three superimposed layers of material at said nodal points and two superimposed layers of material along the lengths of said flanges.

8. A core for a structural element including a plurality of corrugated strips each having a web with flanges on the upper and lower edges thereof directed in planes substantially normal to the plane of said web, the flanges of said strips overlapping one another at the nodal points thereof, the inner ones of the interfitting flanges being depressed at the nodes and the webs engaging at said nodal points adjacent said overlapping flanges to provide a core having the flanges on the opposite sides thereof disposed in substantially the same planes.

References Cited in the file of this patent

UNITED STATES PATENTS

| | | |
|---|---|---|
| 1,784,368 | Loucks | Dec. 9, 1930 |
| 2,056,563 | Budd et al. | Oct. 6, 1936 |
| 2,076,811 | Ehlers | Apr. 13, 1937 |
| 2,220,596 | Bernhardt | Nov. 5, 1940 |
| 2,319,455 | Hardman | May 18, 1943 |
| 2,441,476 | Ewald | May 11, 1948 |
| 2,445,801 | Partiot | July 27, 1948 |
| 2,481,046 | Scurlock | Sept. 6, 1949 |
| 2,540,400 | McHenry | Feb. 6, 1951 |
| 2,545,805 | Callender | Mar. 20, 1951 |
| 2,556,470 | Del Mar | June 12, 1951 |
| 2,581,421 | Lombard | Jan. 8, 1952 |
| 2,608,500 | Del Mar | Aug. 26, 1952 |
| 2,608,502 | Merriman | Aug. 26, 1952 |
| 2,609,068 | Pajak | Sept. 2, 1952 |
| 2,609,314 | Engel | Sept. 2, 1952 |
| 2,609,315 | Engel | Sept. 2, 1952 |
| 2,644,777 | Havens | July 7, 1953 |
| 2,654,686 | Hansen | Oct. 6, 1953 |
| 2,670,026 | Ungar | Feb. 23, 1954 |
| 2,670,314 | Ungar | Feb. 23, 1954 |
| 2,704,587 | Pajak | Mar. 22, 1955 |
| 2,720,948 | Pajak | Oct. 18, 1955 |
| 2,720,949 | Pajak | Oct. 18, 1955 |
| 2,728,479 | Wheeler | Dec. 27, 1955 |
| 2,738,297 | Pfistershammer | Mar. 13, 1956 |

FOREIGN PATENTS

| | | |
|---|---|---|
| 292,708 | Great Britain | June 28, 1928 |